(12) United States Patent
Ding et al.

(10) Patent No.: US 7,339,716 B2
(45) Date of Patent: Mar. 4, 2008

(54) TRANSFLECTIVE ELECTROPHORETIC DISPLAY DEVICE

(75) Inventors: Jau-Min Ding, Taipei (TW);
Chi-Chang Liao, Tai Nan (TW);
Shie-Chang Jeng, Ping Tung Hsien (TW); Yi-Cheng Chen, Hsin Chu (TW); Chih-Chiang Lu, Hsin Chu (TW)

(73) Assignee: Industrial Technology Research Institute, Hsinchu County (TW)

( * ) Notice: Subject to any disclaimer, the term of this patent is extended or adjusted under 35 U.S.C. 154(b) by 280 days.

(21) Appl. No.: 11/253,601

(22) Filed: Oct. 20, 2005

(65) Prior Publication Data

US 2006/0087490 A1 Apr. 27, 2006

(30) Foreign Application Priority Data

Oct. 22, 2004 (TW) .............................. 93132248 A

(51) Int. Cl.
*G02B 26/00* (2006.01)
*G09G 3/34* (2006.01)

(52) U.S. Cl. .................. 359/296; 359/452; 345/107
(58) Field of Classification Search ................ 359/296, 359/452, 316, 318, 320; 345/107, 105, 86, 345/60; 313/110, 495, 584–587; 349/107, 349/113
See application file for complete search history.

(56) References Cited

U.S. PATENT DOCUMENTS

| | | | |
|---|---|---|---|
| 6,639,580 B1 | 10/2003 | Kishi et al. | 345/107 |
| 6,750,844 B2 | 6/2004 | Nakanishi | 345/107 |
| 6,751,007 B2 | 6/2004 | Liang et al. | 359/296 |
| 7,248,394 B2 * | 7/2007 | Ding et al. | 359/296 |

\* cited by examiner

*Primary Examiner*—Loha Ben
(74) *Attorney, Agent, or Firm*—Rabin & Berdo, P.C.

(57) ABSTRACT

A transflective electrophoretic display device is disclosed. The device is comprised of a transparent top substrate and both top and bottom substrates have an electrode structure. A plurality of separated walls and an electrophoretic display solution including a plurality of chromatic particles and a transparent liquid are imposed between the two substrates. A device with a display liquid or a filter plate is used to generate a variety of lights such as monochromatic, color-level or true color having a mixture of red, green and blue. The device of the present invention integrates the merits of the reflective and transmitted displayer, and can be used outdoors, indoors or in darkness. Otherwise, a back light module can compensate for the contrast of the displayer effectively.

32 Claims, 13 Drawing Sheets

TRANSFLECTIVE ELECTROPHORETIC DISPLAY DEVICE

BACKGROUND OF THE INVENTION

1. Field of the Invention

A transflective electrophoretic display device is disclosed, and more particularly, a device employing a plurality of color particles affected by an electric field is introduced to display monochrome or color images.

2. Description of Related Art

A electrophoretic display device, which comprises a plurality of charged particles controlled by a provided electric field, displays by changing reflectivity in a display region therein relative to a surrounding light. The display device has the following features: (1) it's flexible; (2) it incorporates the surrounding light to improve visibility; (3) it can be manufactured by roll-to-roll process, so it has a high yield and reduces the yielding cost; (4) since there is no limit to the viewing angle, the device can be seen from any point of view; (5) it's not sensitive to the distance variation between two panels; (6) the electrophoretic display device has bistability, which is one of the most important characteristic of a flexible display device.

The surface of particles can be charged by being ionized or absorbing other charged particles. When charged particles of an electrophoretic display device are activated by an external electric field, they will move to the opposite direction relative to the electrode with opposite charges. A plurality of factors such as particle type, particle diameter, particle concentration, and the intensity, distribution and direction of the external electric field, and the type of the display solvent of the particles mentioned above will cause different moving speeds of the particles and achieve different displaying purposes.

U.S. Pat. No. 6,750,844 discloses a pliable electrophoretic display device having a deformation-resistant memory characteristic provided by covering a plurality of partitioning walls defining display sections containing a dispersion liquid with electrophoretic particles dispersed therein with an expandable ceiling sheet. U.S. Pat. No. 6,751,007 and No. 6,750,844 further disclose that the partitioning walls with high strength are disposed between the display cells. Wherein, the shape, size and the aspect ratio of the partitioning walls cause the embodiment of the display device. The plurality of pigment particles are dispersed in the solvent, and microcup technology is introduced in these prior arts. The mentioned display device with microcup structure can ignore the boundary sealing of each display cell, and accomplishes a flexible feature.

U.S. Pat. No. 6,751,007 provides a transflective electrophoretic display of SiPix Imaging, Inc. Reference is made to FIG. 1A, which shows one of a plurality of display cells 103 divided by the partitioning walls 109, and forms a display device. The cell 103 includes a top substrate 101, a bottom substrate 102 with electrodes, surrounding partitioning walls, and a plurality of pigment particles 104 in the display solvent 105 filled in a space isolated by the plurality of partitioning walls 109, and the display cell 103 is sealed by a sealing layer 106, and finally a backlight module 107 is disposed to compensate for the displaying of the electrophoretic display device.

An electric field is generated by the electrodes in the top or bottom substrate as shown in FIG. 1A, and an electric field is used to affect the behavior of the pigment particles 104 in the display solvent 105. The types of the electric field include an up/down switching mode, an in-plane switching mode and a dual switching mode. As shown in FIG. 1A, the top substrate 101 can be a conducting glass such as Indium Tin Oxide (ITO), and the bottom substrate 102 includes in-plane electrodes 110a and 110b divided by the partitioning slabs 112 and the bottom electrode 111.

Furthermore, U.S. Pat. No. 6,639,580 (Electrophoretic Display Device and Method for Addressing Display Device) discloses the technology of an in-plane electric field. Wherein the in-plane electrode generates an in-plane electric field to change the status of the charged particles in the display solvent and generate various display effects.

FIG. 1B shows a display device of the prior art formed by a plurality of display cells 103 including a plurality of microcups arranged in a rectangular array. The display cell 103 of one of the embodiments includes primary colors such as red, green and blue for displaying color, namely, a three-monochromatic display cell forms a chromatic display cell.

The chromatic display cell 20 shown in FIG. 2A includes three separated primary color sub-display cells. A plurality of white charged pigment particles 24 in the colorless display solvent 25 scatters the light emitted from the backlight module. Another embodiment shows the filtering plates 21, 22 and 23 with red, green and blue disposed in these sub-display cells.

An electric field with a different status generated by the electrodes disposed in the bottom substrate is used to guide the behavior of the charged pigment particles 24, and further results in the scattering effect mentioned above. The primary color filtering plates 21, 22 and 23 are used to display a variety of color effects. In yet another embodiment, a further displaying result occurs if the white pigment particles 24 are changed to light-absorbed black pigment particles.

FIG. 2B shows a chromatic display device of the prior art. The display cell 20 includes three sub-display cells with red, green and blue colors. The colorless and transparent display solvent 25 includes color pigment particles 26, 27 and 28, which are red pigment particles 26, green pigment particles 27 and blue pigment particles 28 respectively. The electric field is changed by the electrode in the bottom substrate with black or white plates. Those color pigment particles 26, 27 and 28 in the display solvent 25 are then activated to display various effects.

The reflective-type electrophoretic displayer of the prior art doesn't function when the surrounding light is weak or nonexistent. Moreover, the transmissive-type electrophoretic displayer is not adaptable to portable devices since it consumes a lot of power.

Some drawbacks are associated with the technology having partitioning walls in the prior art provided by the SiPix Imaging, Inc. Since the partitioning walls 109 are used as the medium for the backlight, this allows the electrophoretic displayer to operate in the dark, but the partitioning walls may possibly cause light leakage. Moreover, the backlight doesn't go through the display solvent directly, so it doesn't provide a quality of high display. Meanwhile, the electrophoretic displayer includes both the reflective-type and the transmissive-type, so it has complicated design and is difficult to fabricate.

In view of the aforementioned drawbacks of the prior art, the present invention provides a transflective electrophoretic display device, which facilitates illumination effects since both the surrounding light and the backlight can go through the display solvent completely. Meanwhile, the backlight module can be adjusted based on the condition of surrounding light, and effectively enhances the contrast of the display and reduces power consumption. Furthermore, the present invention has a simplified design and higher manufacturing yield.

SUMMARY OF THE INVENTION

A transflective electrophoretic display device is provided for illuminating with or without surrounding light. A light emitted from a backlight module can be adjusted according to the condition of the surrounding light so as to reduce power consumption and enhance the quality of the display.

The transflective electrophoretic display device is composed of a plurality of display cells, the display device comprises a top substrate, which is a transparent substrate having a plurality of anisotropic reflective plates; a bottom substrate having a plurality of light plates and a plurality of electrodes so as to generate an electric field, and the bottom substrate is installed opposite to the top substrate; a plurality of partitioning walls, which are transparent materials are disposed between the top substrate and the bottom substrate so as to isolate the plurality of display cells; a display solution, which is composed of a plurality of pigment particles and transparent liquid to fill a space isolated by the top substrate, the bottom substrate and the partitioning walls. Wherein, the electric field in the display cell is changed to guide the behavior of the plurality of charged pigment particles in the display solution, a light emits to the anisotropic reflective plates of the top substrate through the partitioning walls, and the plates reflect the light to the display solution so as to radiate monochromatic or gray-scale effects.

The transflective electrophoretic display device is composed of a plurality of display cells, and each display cell is further composed of a plurality of sub-display cells having red, green and blue colors. The display device comprises a top substrate, which is a transparent substrate having a plurality of anisotropic reflective plates; a bottom substrate having a plurality of light plates and a plurality of electrodes so as to generate an electric field, and the bottom substrate is installed opposite to the top substrate; a plurality of partitioning walls, which are transparent materials and disposed between the top substrate and the bottom substrate so as to isolate the plurality of sub-display cells; a red display solution, a green display solution and a blue display solution which are composed of a plurality of pigment particles and transparent liquids so as to fill a space isolated by the top substrate, the bottom substrate and the partitioning walls. Wherein, the electric field in the display cell is changed to guide the behavior of the plurality of charged pigment particles in the red, green, and blue display solution, a light emits to the anisotropic reflective plates of the top substrate through the partitioning walls, and the reflective plates reflect the light to the red, green and blue display solution so as to radiate color effects.

Furthermore, the transflective electrophoretic display device of another embodiment is composed of a plurality of display cells, and the display cell is further composed of a plurality of sub-display cells having a red filter, a green filter and a blue filter with a transparent material installed on the top substrate or the bottom substrate.

BRIEF DESCRIPTION OF THE DRAWINGS

The present invention will be readily understood by the following detailed description in conjunction with the accompanying drawings, in which.

DETAILED DESCRIPTION OF PREFERRED EMBODIMENTS

To allow the examiner to understand the technology, means and functions adopted in the present invention further, reference is made to the following detailed description and attached drawings. The examiner shall readily understand the invention deeply and concretely from the purpose, characteristics and specification of the present invention. Nevertheless, the present invention is not limited to the attached drawings and embodiments in following description.

A transflective electrophoretic display device of the present invention is introduced to integrate the advantages of the conventional reflective and transmissive electrophoretic displayer. The display device includes a transparent top substrate, and a top/bottom substrate having in-plane electrodes. A plurality of partitioning walls and a display solution having a plurality of pigment particles and a transparent liquid are disposed between the two substrates so as to generate monochromatic, or color-scale, or color effects. The display device of the present invention facilitates brightness since both the surrounding light and the backlight can go through the mentioned display solution completely. Moreover, the brightness of the backlight can be adjusted based on the condition of the surrounding light, and effectively enhance the contrast of the display and reduce the power consumption.

Figure 1A:
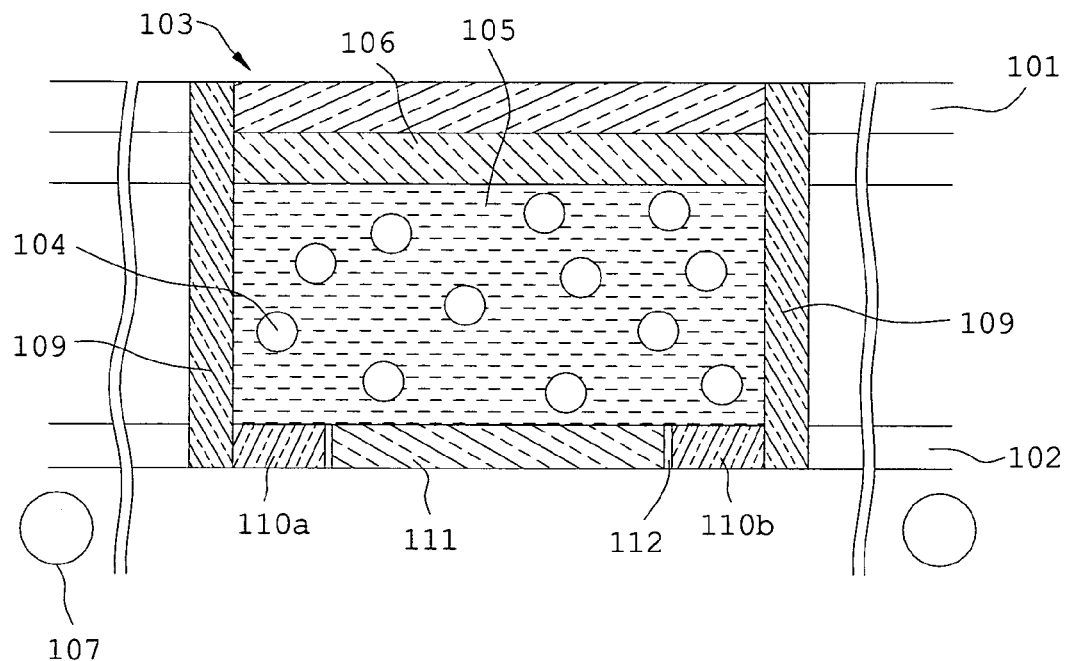
FIG. 1A is a schematic diagram of a display cell of a transflective electrophoretic display of the prior art.
Figure 1B:
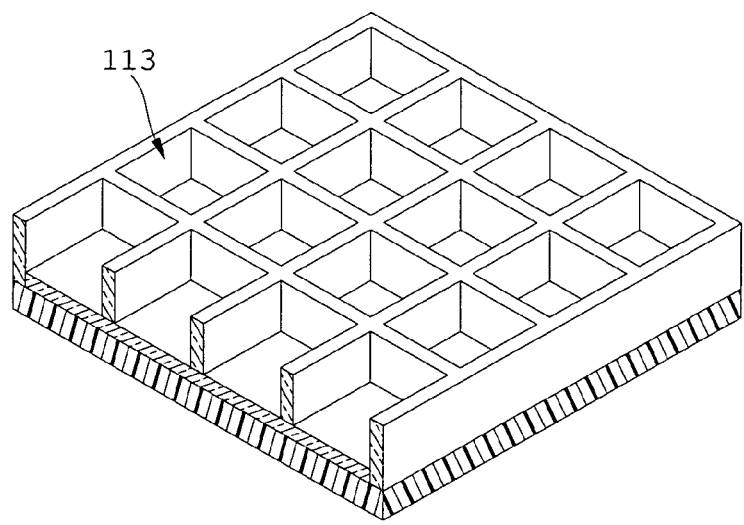
FIG. 1B is a schematic diagram of a transflective electrophoretic display of the prior art.
Figure 2A:
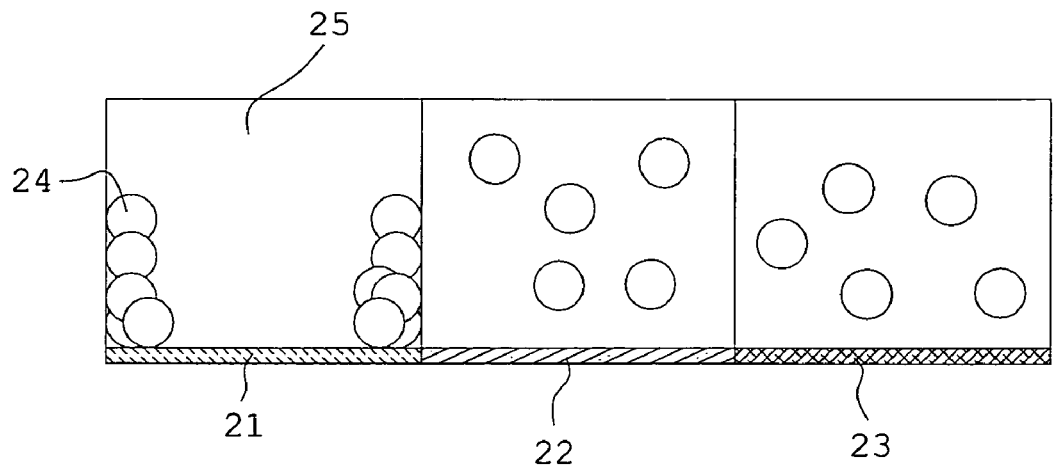
FIG. 2A is a schematic diagram of the color display device of the prior art.
Figure 2B:
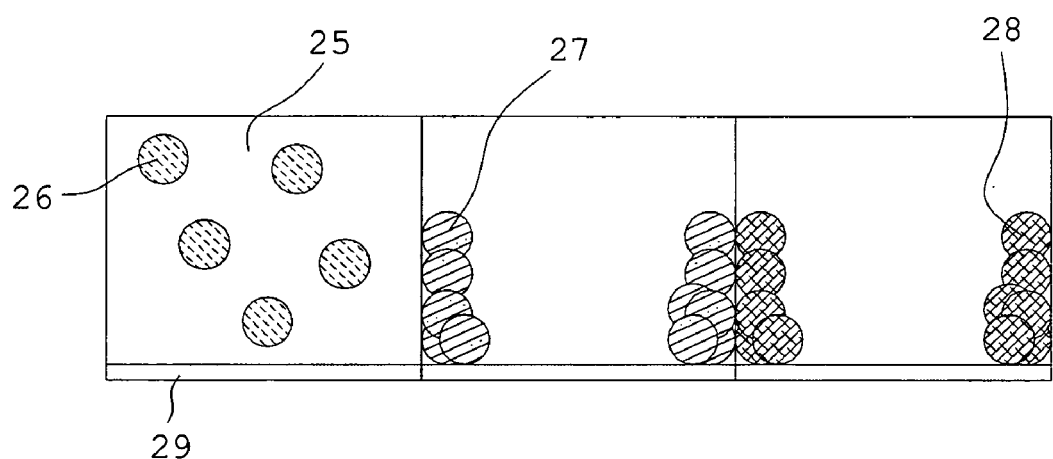
FIG. 2B is a schematic diagram of the color display device of the prior art.
Figure 3:
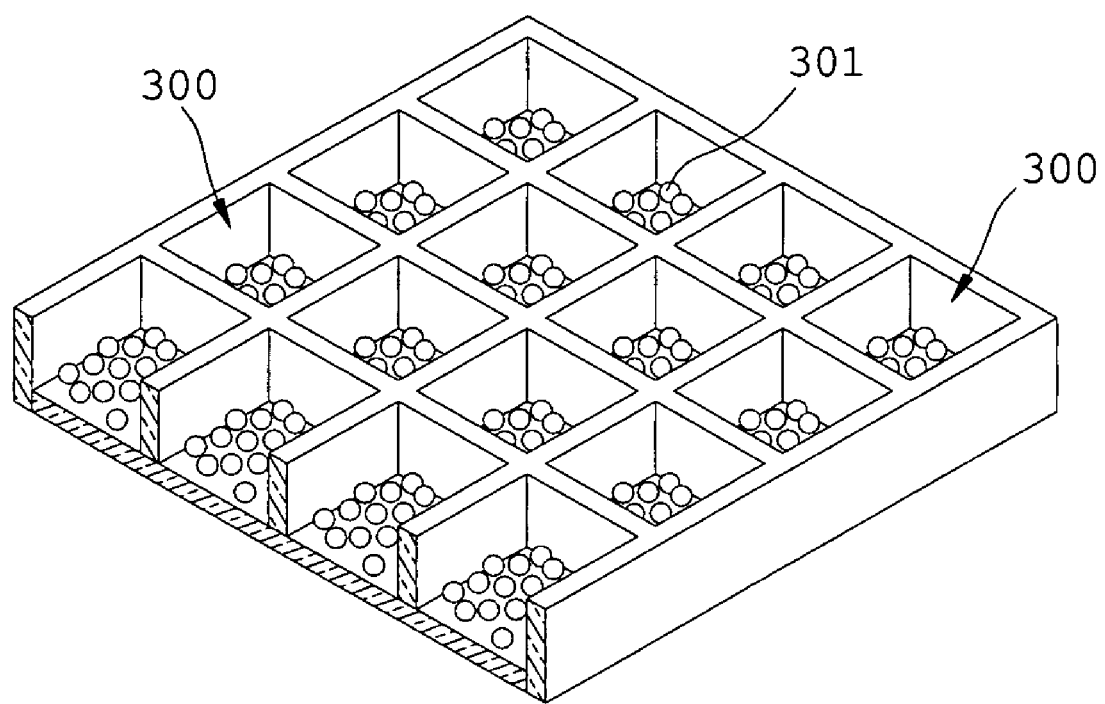
FIG. 3 is a schematic diagram of a transflective electrophoretic display device of the present invention.

FIG. 3 is a schematic diagram of a transflective electrophoretic display device composed of a plurality of display cells 300, which form a rectangular array, and other embodiments such as a hexagon, a circular form, a rhombus or the like, but not limited to these. The display device of the present invention can be implemented as a flexible device because of the microcup structure therein. The display cell 300 is isolated by the top substrate, the bottom substrate and the plurality of partitioning walls; a space therebetween can be filled with a transparent liquid having a plurality of pigment particles 301. Wherein, the pigment particles 301 can be white, black, chromatic, or other transparent chromatic particles. An electric field generated in virtue of the electrodes in the substrates can be changed to change the dispersed behavior of the charged particles so as to change the displaying effect.

Figure 4A:
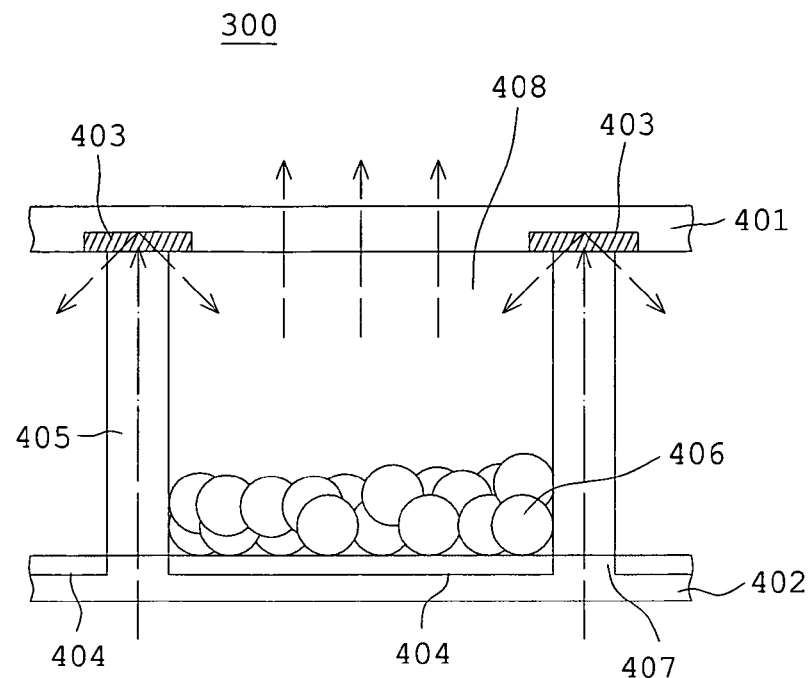
FIG. 4A is a lateral view of the first embodiment of the present invention in a WHITE-state.
Figure 4B:
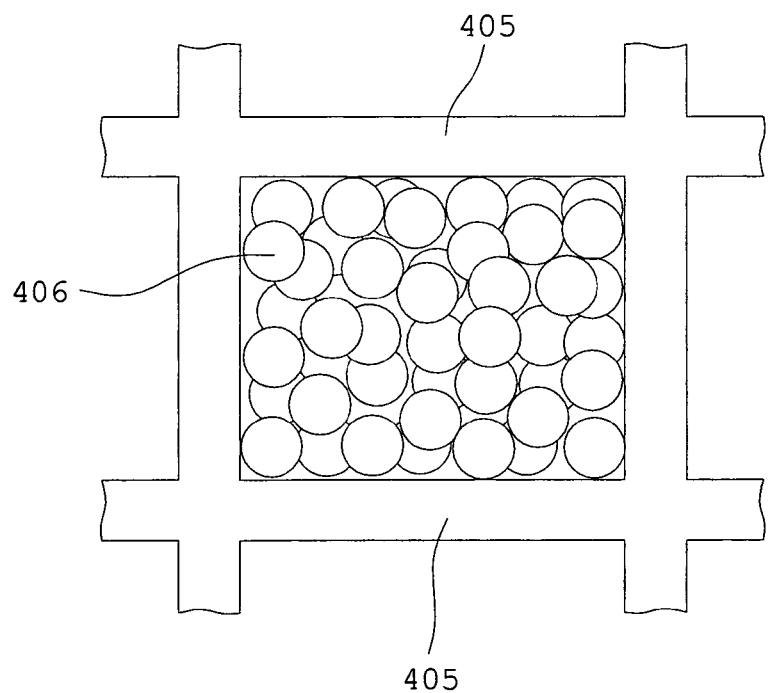
FIG. 4B is an overlooking viewing view of the first embodiment of the present invention in a WHITE-state.

FIG. 4A and FIG. 4B show the first embodiment of the present invention in a white state. The display cell 300 includes a top substrate 401 with a transparent material, a bottom substrate 402 having an electrode structure installed on the other side of the top substrate 401, and a space isolated by the partitioning walls 405. A plurality of anisotropic reflective plates 403 are installed along the top substrate 401 relative to the positions of the partitioning walls 405. The electrodes with in-plane switching mode are disposed in the bottom substrate 402 or even the top substrate 401 so as to generate an in-plane electric field. A black absorbing plate 404 of the preferred embodiment is installed along the bottom substrate 402 excluding the area where the partitioning walls 405 contact the bottom substrate. The aforementioned partitioning walls 405 are transparent, and a light source (not shown in this diagram) is set below the display cell 300. A backlight from the light source is emitted to the anisotropic reflective plates 403 of the top substrate 401 from a gap 407 of the absorbing plate and through the partitioning walls 405. The incidental light is reflected to the space of the cell, but not the original direction from the light source due to the anisotropic reflective plates 403. Additionally, the surrounding light also enters the display solution 408 and fills the space identical to the backlight so as to enhance the displaying effect efficiently.

The mentioned electrophoretic display solution 408 includes the charged white particles 406 and the transparent liquid of the preferred embodiment. The features of the display solution, such as its color and transparency, are used to generate various displaying modes, or even collocate the features, such as color, transparency and reflectivity, of the bottom substrate.

Nevertheless, the area of the anisotropic reflective plates of the top substrate is larger or equal to the area occupied by the partitioning walls. In this embodiment, the area of the anisotropic reflective plates occupy 1% to 99% of the total area of the display device, but 7% to 60% is preferred to produce better displaying effects. The open area of the space of the display cell is $10^2$ to $10^6$ μm$^2$, but the preferred area is $10^3$ to $10^5$ μm$^2$. The distance between the top substrate and the bottom substrate is 5 to 200 μm, but the preferred distance is 10 to 100 μm.

The first embodiment in white-state is shown in FIG. 4A. The dash line shows the light path of the backlight emitted through the gap 407 from a backlight module below the bottom substrate 402 to the anisotropic reflective plates 403 of the top substrate 401 via the partitioning walls 405. The backlight is reflected by the anisotropic reflective plates 403 to the display solution 408 of the cell, and the display cell displays a white state since the charged white particles 406 reflects or scatters the light out. The light source can also be surrounding light emitting to the display cell 300 through the top substrate 401, and reflected or scattered by the white particles 406 so as to display a white state. In another embodiment, the color of pigment particles can be changed to another color or become transparent so as to radiate the various colors of the display device.

FIG. 4B shows an overlooking view of the display device in a white state. Each display cell 300 thereof is isolated by the partitioning walls 405 between the top and bottom substrates. The white particles 406 with reflective features are dispersed on the bottom substrate 402, the white particles 406 reflect the incidental light out to form white light.

Figure 5A:
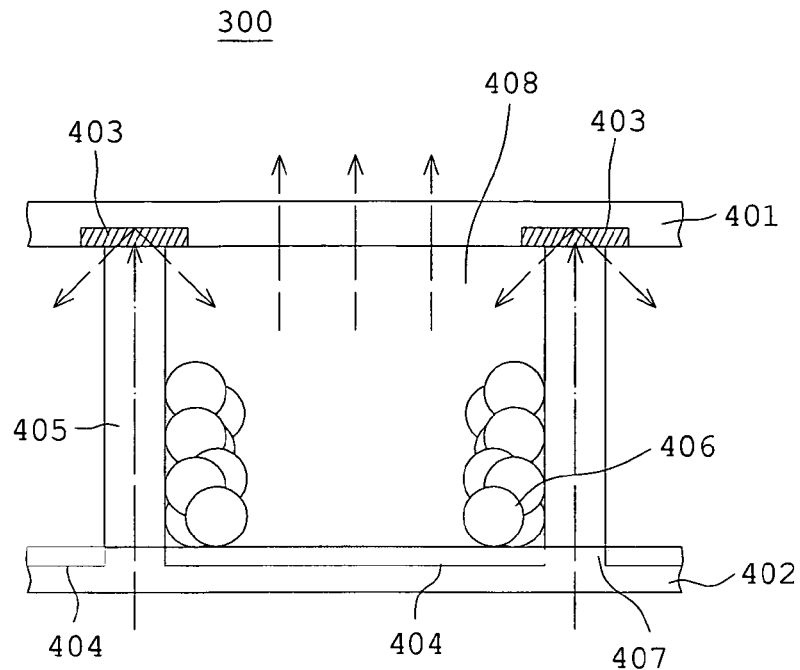
FIG. 5A is a lateral view of the first embodiment of the present invention in a BLACK-state.

FIG. 5A is a lateral view of the first embodiment of the present invention in the black state. The backlight emits through the gap 407 of the absorbing plate 404 to the top substrate 401 via the transparent partitioning walls 405. The anisotropic reflective plates 403 reflect the light to the display solution 408 of the display cell 300. The white particles 406 are dispersed leaning against the partitioning walls 405 due to the effect of the electric field. Since the bottom of the display cell 300 is the black absorbing plate 404, the reflected light is absorbed by the plate 404 so as to radiate in a black state. Similarly, the surrounding light enters the display solution 408 directly and becomes absorbed by the black absorbing plate 404 so as to radiate in a black state. If the anisotropic reflective plates 403 are chromatic plates in this embodiment, the display device 300 can display various effects.

Figure 5B:
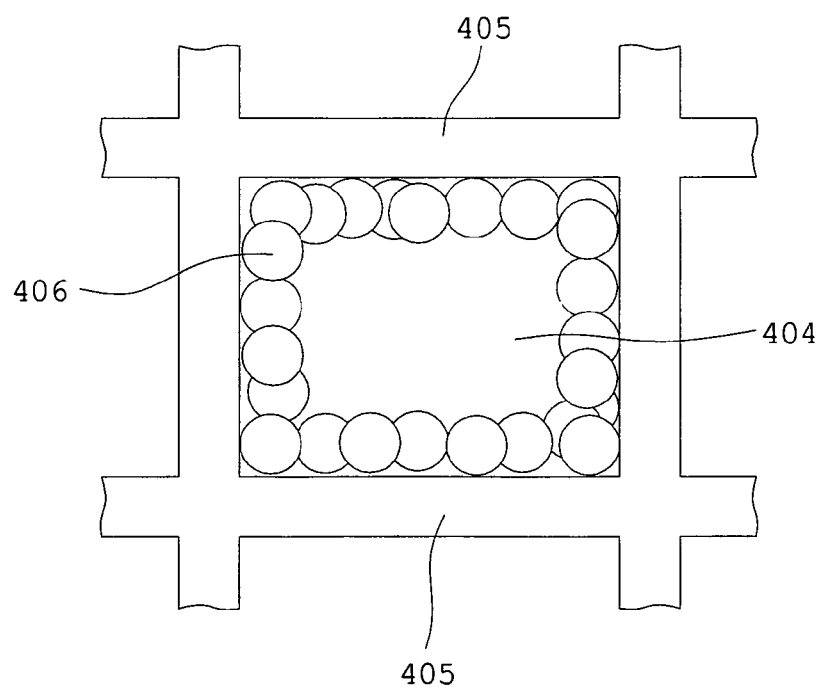
FIG. 5B is an overlooking view of the first embodiment of the present invention in a BLACK-state.

Reference is made to FIG. 5B, which shows an overlooking view of the first embodiment in a black state. The white particles 406 are dispersed leaning against the partitioning walls 405 due to the action of the electric field. The absorbing plate 404 of the bottom substrate 402 absorbs the incidental light so as to radiate in a black state.

Figure 6A:
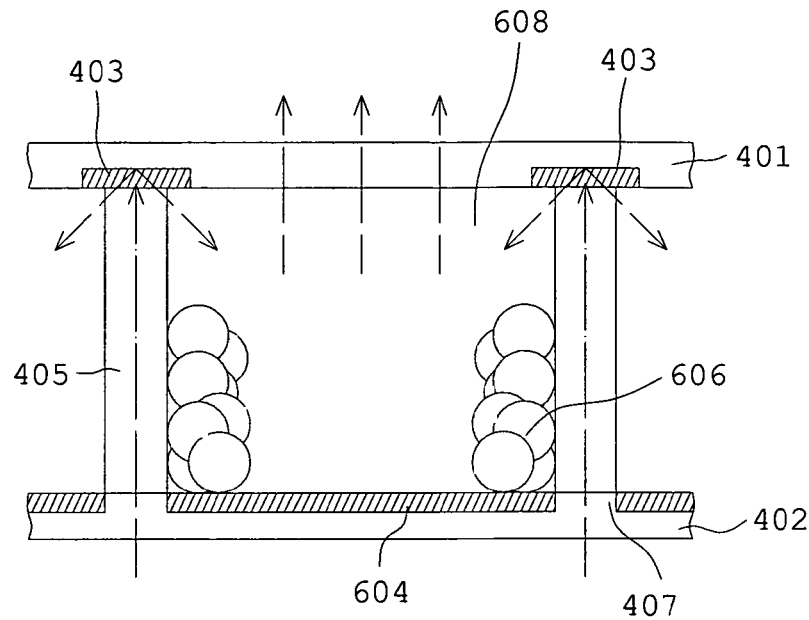
FIG. 6A is a lateral view of the second embodiment of the present invention in a WHITE-state.

The structure of the display cell of the second embodiment shown in FIG. 6A is similar to the structure in FIG. 4A. Wherein a space of the display cell is isolated by the partitioning walls 405 between the top substrate 401 and the bottom substrate 402. The space is filled with a display solution 608 having a plurality of black particles 606 and a transparent liquid. The plurality of anisotropic reflective plates 403 is disposed along the top substrate 401 excluding the area where the partitioning walls 405 contact the top substrate 401. The electrodes can be installed on the top or bottom substrate, and thereby the electric field is generated accordingly. The absorbing or reflective plates, such as the reflective plate 604 shown in the diagram, are disposed along the bottom substrate 402 excluding the area where the partitioning walls 405 contact the bottom substrate 402. A light source set below the display cell emits through the gap 407 of the reflective plate 604 and goes through the partitioning walls 405. The anisotropic reflective plates 403 of the top substrate 401 reflect the light to the display solution 608 so as to radiate in a white state since the reflective plate 604 reflects the incidental light.

The charged black particles 606 are dispersed leaning against the partitioning walls 405 according to the action of the electrodes in the top substrate 401 or the bottom substrate 402. The incidental light is reflected or scattered by the reflective plate 604 of the bottom substrate 402 so as to radiate in a white state. The color of the reflective plate 604 of another embodiment can be changed to display various effects.

Figure 6B:
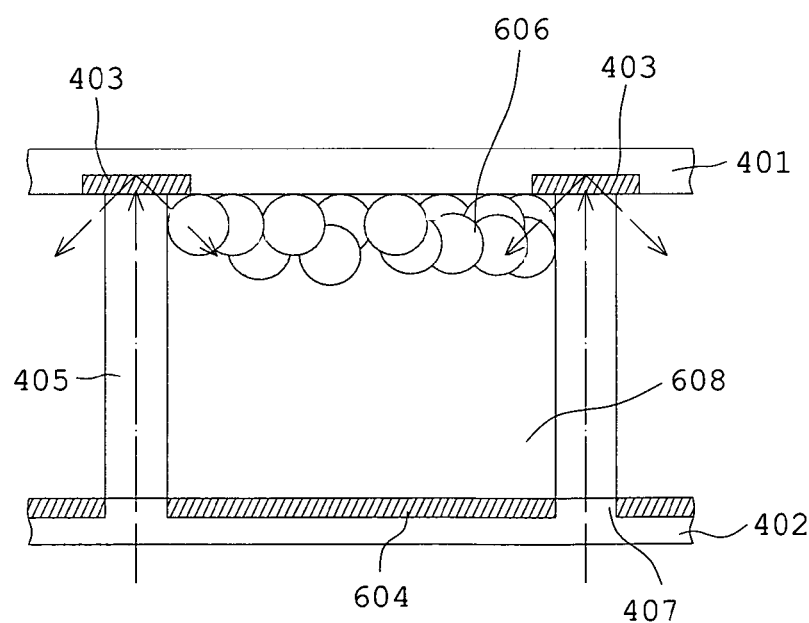
FIG. 6B is a lateral view of the second embodiment of the present invention in a BLACK-state.

FIG. 6B shows the second embodiment of the present invention in a black state. The black particles 606 thereof are dispersed to the top substrate 401 according to the action of the electric field generated by the electrodes in the top or the bottom substrate. After that, the black particles 606 block the light reflected or scattered by the reflective plate 604 of the bottom substrate 402. They also block the incidental surrounding light so as to radiate in a black state. Wherein, the display cell 300 shows different colors since the black particles 606 can be changed to other color particles.

The structure of the mentioned display cell includes the top substrate 401 having electrodes therein and the anisotropic reflective plates 403 are disposed along the area where the partitioning walls 405 contact the top substrate 401. The display cell further includes the bottom substrate 402 having lateral electrodes and the reflective plate 403 therein. The display cell composed of the top substrate 401 and the bottom substrate 402 is a micro-structure, and the display solution 408 that fills the isolated space inside contains the plurality of black particles 606 and the transparent liquid.

The electric field generated by the electrodes in the bottom substrate 402 can be an in-plane switching mode. The electric field generated by the electrodes disposed in both the top substrate 401 and the bottom substrate 402 can be an up/down switching mode, an in-plane switching mode, or a dual switching mode. A backlight module is further disposed below the bottom substrate 402.

The present invention also provides a display cell for displaying color effects. The display cell therein at least includes three sub-display cells with the three primary colors, and each cell is composed of a transparent top substrate, the top/bottom substrate having in-plane electrodes, the plurality of partitioning walls therebetween and the display solution having the plurality of charged pigment particles and the transparent liquid with three different colors or three color filters. Both the surrounding light and the backlight can go through the display solution completely so as to enhance the displaying effect. The backlight can be adjusted so that it appears to be brighter or darker based on the condition of the surrounding light. Thereby, the present invention can efficiently reduce power consumption and enhance the contrast and tint.

Figure 7A:
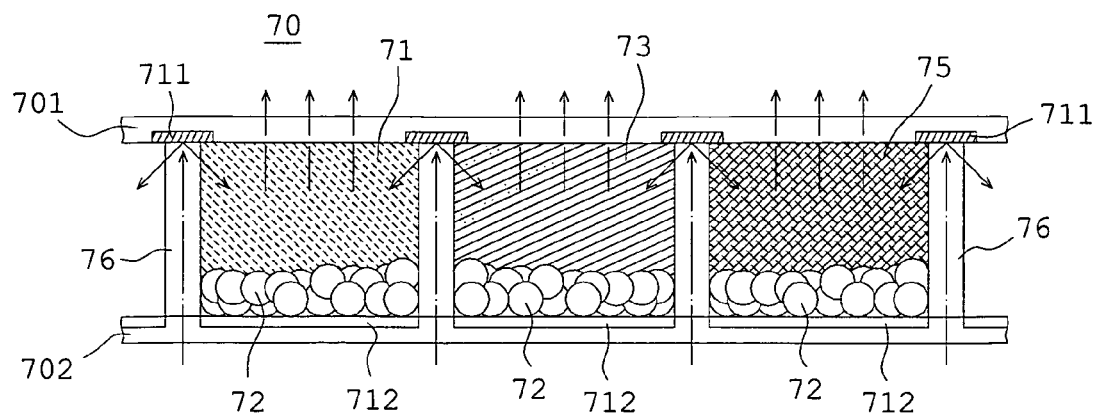
FIG. 7A is a lateral view of the third embodiment of the present invention in a WHITE-state.
Figure 7B:
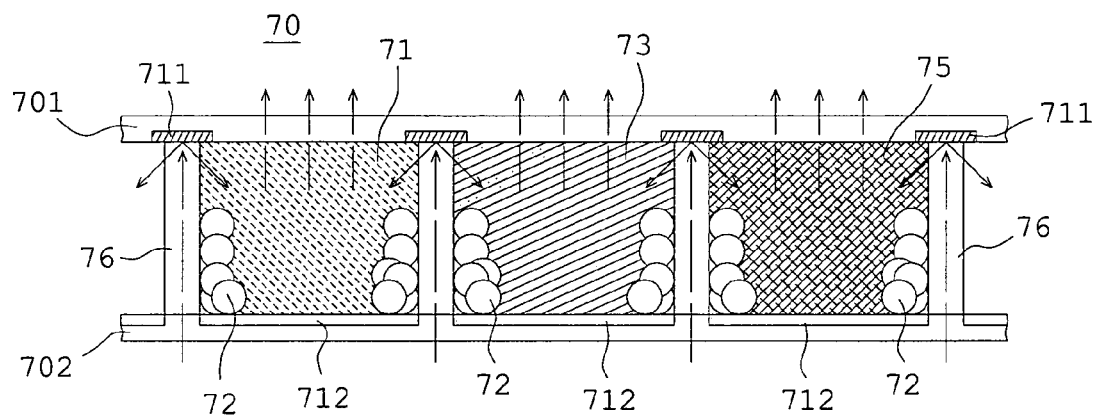
FIG. 7B is a lateral view of the third embodiment of the present invention in a BLACK-state.
Figure 7C:
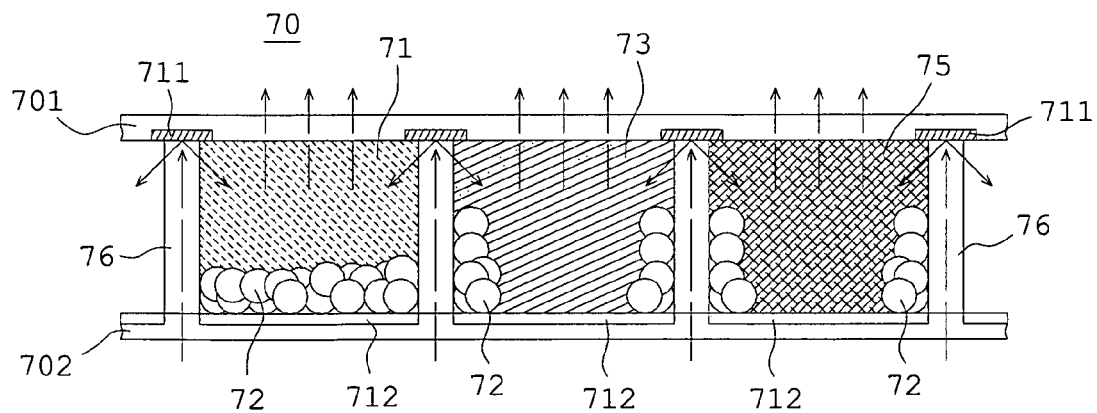
FIG. 7C is a lateral view of the third embodiment of the present invention in a RED-state.

FIGS. 7A, 7B and 7C are the lateral view of the third embodiment of the present invention. The color display cell 70 includes the top substrate 701 with a transparent material, the bottom substrate 702 with electrodes disposed along the bottom substrate 702 opposite to the top substrate 701, a micro-structure space isolated by the partitioning walls 76. The color display cell 70 displays color effects using the sub-display cells having the three primary colors, red, green and blue. Otherwise, the electrodes disposed in the top substrate 701 and the bottom substrate 702 can generate an up/down switching mode, an in-plane switching mode or the a dual switching mode.

An absorbing or reflecting plate, such as the black absorbing plate of this embodiment, is installed along the bottom substrate 702 excluding the area where the partitioning walls 76 contact the bottom substrate 702. The partitioning walls 76 thereof are transparent, and the light source is disposed below the color display cell 70. The light shown as the dash line in the diagram emits from the light source through the gap of the absorbing plate 712, and enters the partitioning walls 76, then hits the anisotropic reflective plate 711 of the top substrate 701. The light is finally reflected by the anisotropic reflective plate 711 and enters the space of the color display cell 70. The aforementioned light can completely pass through the display solutions 71, 73 and 75, and the surrounding light can also enter the display cell 70 so as to radiate light efficiently.

Further, the color display cell 70 includes a transparent liquid such as a red display solution 71, a green display solution 73 and a blue display solution 75. Therein, the liquid contains charged pigment particles 72 including the white particles that can reflect or scatter light broadly. The light reflected by the anisotropic reflective plate 711 can radiate different color effects through the color display solution.

FIG. 7A shows the third embodiment in the white state of the present invention. Wherein, the dash line presents the path of light, which emits from the backlight module below the bottom substrate 702 through the gap of the absorbing plate 712 thereof. After that, the light enters the partitioning walls 76, and is reflected by the anisotropic reflective plates 711 disposed on the top substrate 701. Then the reflected light goes into the spaces filled with the red, green and blue display solutions 71, 73 and 75 respectively. In the meantime, since the charged pigment particles 72 in the display solutions 71, 73 and 75 controlled by the electric field are dispersed on the bottom substrate 702, the incidental light reflected by the anisotropic reflective plates 711 is reflected or scattered by the white particles 72. Afterwards, the light reflected or scattered from each color solution radiates and is mixed into an even white light of this embodiment. Otherwise, both the backlight and the surrounding light pass through the display solutions 71, 73 and 75 completely and are reflected or scattered so as to become an efficient display cell.

FIG. 7B is a lateral view of the third embodiment of the present invention in a black state. The color display cell 70 includes at least three primary color sub-display cells. The light emits through the gap of the absorbing plate 712 of the bottom substrate 702, and enters the transparent partitioning walls 76. Then the light hits the top substrate 701, and the anisotropic reflective plates 711 thereof reflect the incidental light to the spaces filled with the display solutions 71, 73 and 75 respectively. In this embodiment, since the white particles 72 are dispersed leaning against the partitioning walls 76, the bottom of the space shows the black absorbing plate 712, which absorbs the incidental light so as to radiate in the black state of the color display cell 70.

FIG. 7C shows the red state of the third embodiment. The pigment particles 72 in the green display solution 73 and the blue display solution 75 are dispersed leaning against the partitioning walls 76 due to the action of the electric field, then the bottom substrate 702 allows the black absorbing plate 712 to be seen yet doesn't reflect or scatter any chromatic light. However, the pigment particles 72 in the red display solution 71 are dispersed on the bottom substrate 702 so as to reflect the incidental light reflected by the anisotropic reflective plates 11. The reflected light passes through the red display solution 71 so as to radiate in a red state.

The aforementioned embodiments show the color display cell 72 can display a variety of states since the pigment particles 72 thereof vary based on the action of the electric field.

Figure 8A:
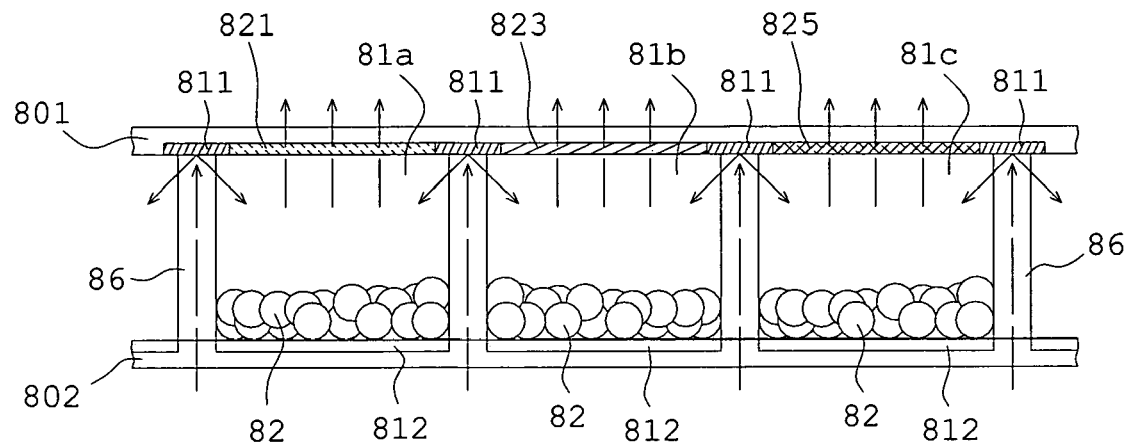
FIG. 8A is a lateral view of the fourth embodiment of the present invention in a WHITE-state.

FIG. 8A is a lateral view of the fourth embodiment of the present invention in a white state. These micro-structure spaces of the display cell isolated by the partitioning walls 86 between the top substrate 801 and the bottom substrate 802 are filled with transparent display solutions 81*a*, 81*b* and 81*c* having a plurality of white and reflective pigment particles 82. The anisotropic reflective plates 811 are disposed along the top substrate 801 relative to the position of the partitioning walls 86. Furthermore, red, green and blue filters 821, 823 and 825 with transparent material are disposed along the bottom substrate 802 relative to the position of the micro-structure space. The white state of the display cell is created by mixing the primary colors for each sub-display cell. The light emits from the backlight module installed on the one side of the bottom substrate 802 to the anisotropic reflective plates 811 of the top substrate 801 through the partitioning walls 86. Then the reflected light goes through the display solutions 81*a*, 81*b* and 81*c* of the sub-display cells. Meanwhile, the charged pigment particles 82 therein are dispersed upon the substrate 802 due to the action of the electric field. After that, the incidental light reflects and passes through the red filter 821, the green filter 823 and the blue filter 825, finally forming white light. The surrounding light can be incorporated as the light source of the present embodiment; both the backlight and the surrounding light are used to enhance the displaying efficiency.

Figure 8B:
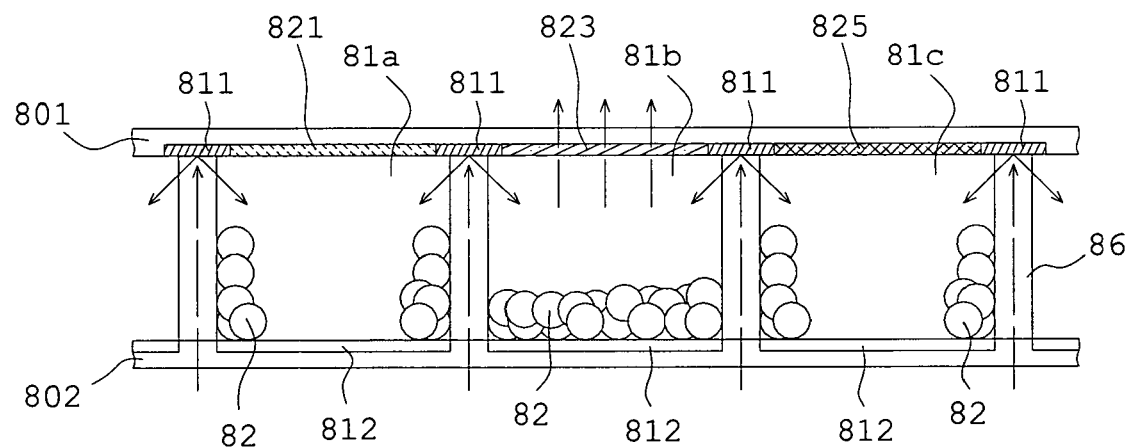
FIG. 8B is a lateral view of the fourth embodiment of the present invention in a GREEN-state.

FIG. 8B shows the green state of the display cell having the red filter 821, the green filter 823 and the blue filter 825 on the top substrate 801. The pigment particles 82 are changed due to the action of the electric field. The various states of the pigment particles 82 cause various displaying effects because of the mixture of the primary colors. As shown in the diagram, the pigment particles 82 in the display solutions 81*a* and 81*c* are dispersed leaning against the partitioning walls 86 due to the action of the electric field. When the light hits the black absorbing plates 812 on the bottom substrate 802 through the display solutions 81*a* and 81*c*, no red or blue light is reflected from these sub-display cells. But the pigment particles 82 in the display solution 81*b* are dispersed upon the bottom substrate 802. Finally, the incidental light reflected or scattered by the pigment particles 82 passes through the green filter 823 so as to radiate green light.

If the white particles are changed to pigment particles with absorbing material, the white state of the display cell will be shown as the fifth embodiment of the present invention. The micro-structure spaces filled with the red display solution 71, the green display solution 73 and the blue display solution 75 respectively are isolated by the partitioning walls 76 between the top substrate 701 and the bottom substrate 702. Bottom reflective plates 912 are disposed along the bottom substrate 702 relative to the position of the display solutions 71, 73 and 75. The aforementioned bottom reflective plate 912 can be a scattering-type reflective plate. The pigment particles 92 with absorbing material are dispersed leaning against the partitioning walls 76 due to the action of the electric field. After that, the light reflected by the anisotropic reflective plates 711 is reflected by the bottom reflective plates 912 and passes through the display solutions 71, 73 and 75 with red, green and blue colors so as to radiate in a white state.

Figure 9A:
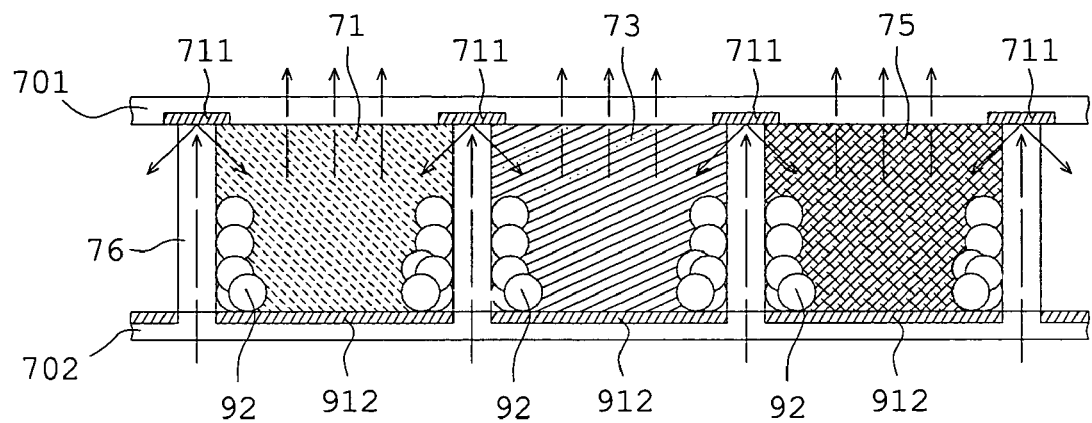
FIG. 9A is a lateral view of the fifth embodiment of the present invention in a WHITE-state.
Figure 9B:
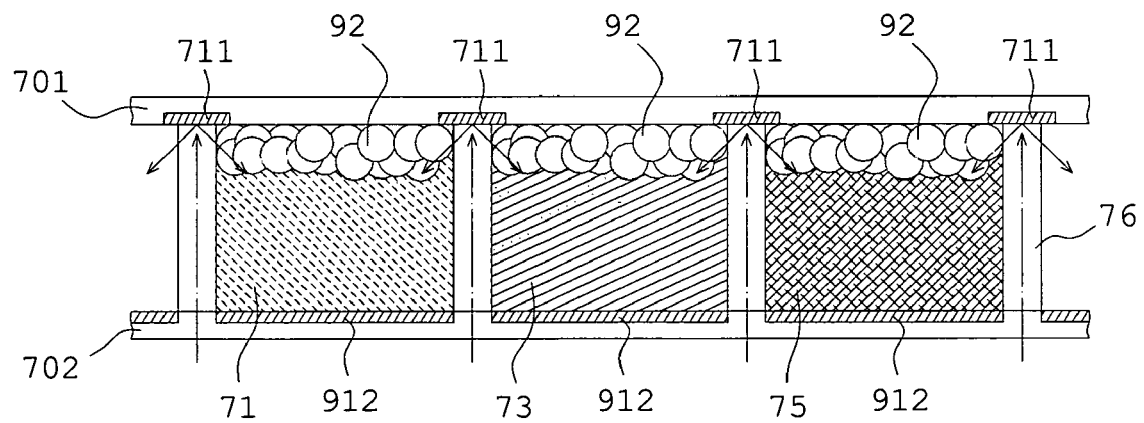
FIG. 9B is a lateral view of the fifth embodiment of the present invention in a BLACK-state.

Reference is made to FIG. 9B, which shows the fifth embodiment of the present invention in a black state. The charged pigment particles 92 are dispersed upon the top substrate 701, so the light reflected by the bottom reflective plates 912 is blocked by the pigment particles 92 so as to display a black state. The states of the pigment particles can be changed to display various effects based on the action of the electric field.

Figure 10A:
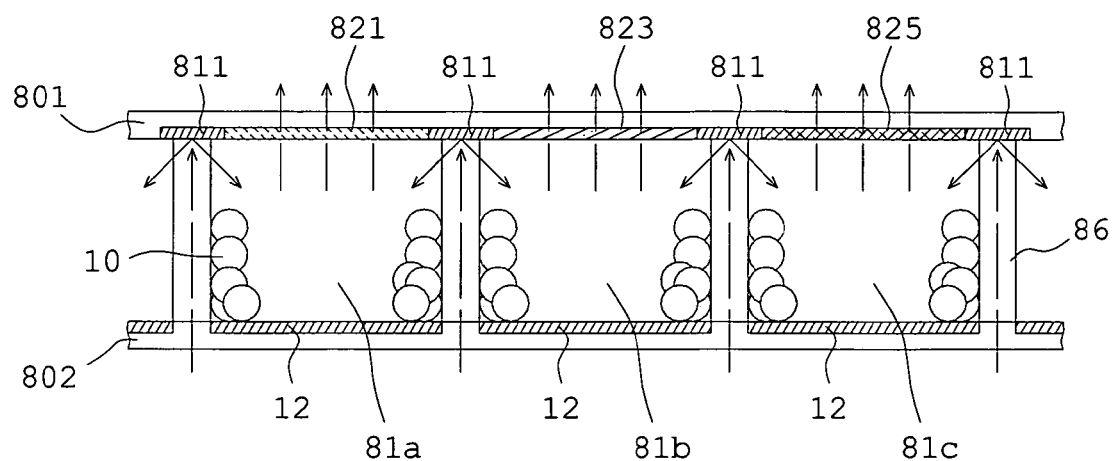
FIG. 10A is a lateral view of the sixth embodiment of the present invention in a WHITE-state.

FIG. 10A is a lateral view of the sixth embodiment of the present invention in a white state. The micro-structure spaces are filled with the transparent display solutions 81*a*, 81*b* and 81*c*. Wherein, a color display cell of the present embodiment includes red, green and blue sub-display cells having the plurality of pigment particles with absorbing material. The charged pigment particles 12 vary according to the action of the electric field. The pigment particles 10 are dispersed leaning against the partitioning walls 86 of the embodiment, and the light is reflected or scattered by the bottom reflective plates 12 as it passes through the filters 821, 823 and 825 and displays white light by mixing the primary colors.

Figure 10B:
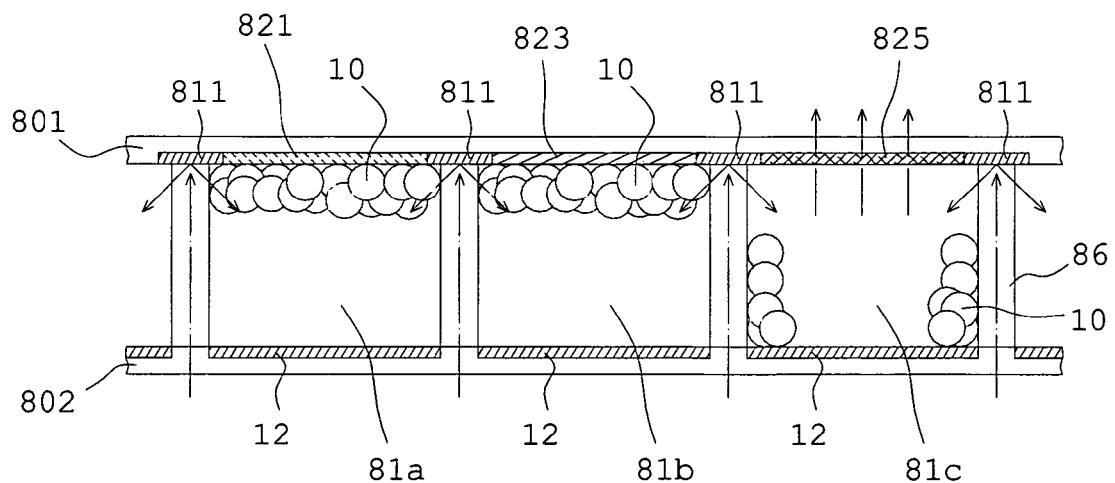
FIG. 10B is a lateral view of the sixth embodiment of the present invention in a GREEN-state.

FIG. 10B is a lateral view of the sixth embodiment of the present invention in a green state. The pigment particles 10 in the display solutions 81*a*, 81*b* are dispersed upon the top substrate 801, and used to block the light reflected or scattered by the bottom reflective plates 12, so the reflected or scattered light won't pass through the red filter 821 and the green filter 823. Nevertheless, the pigment particles 10 in the display solution 81*c* are dispersed leaning against the partitioning walls 86, so the light reflected or scattered by the bottom reflective plate 12 will pass through the blue filter 825 so as to radiate in a blue state.

Figure 11A:
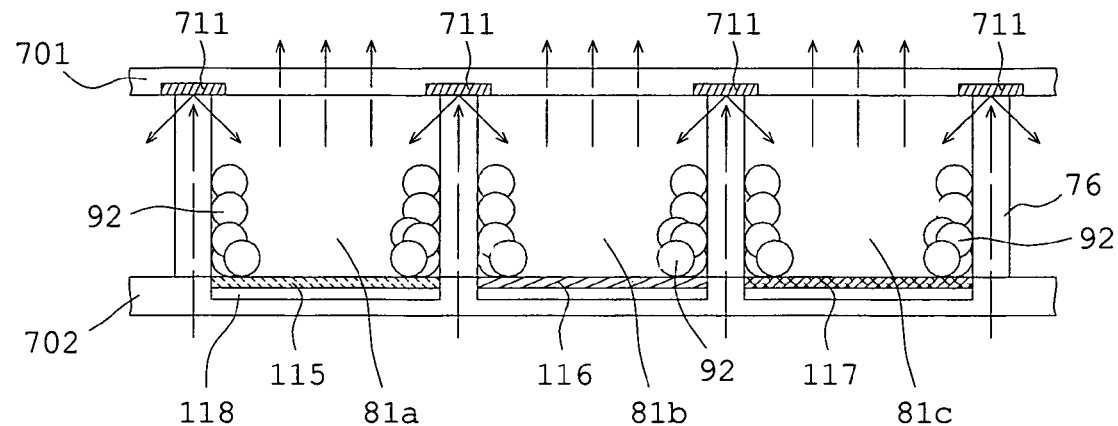
FIG. 11A is a lateral view of the seventh embodiment of the present invention in a WHITE-state.
Figure 11B:
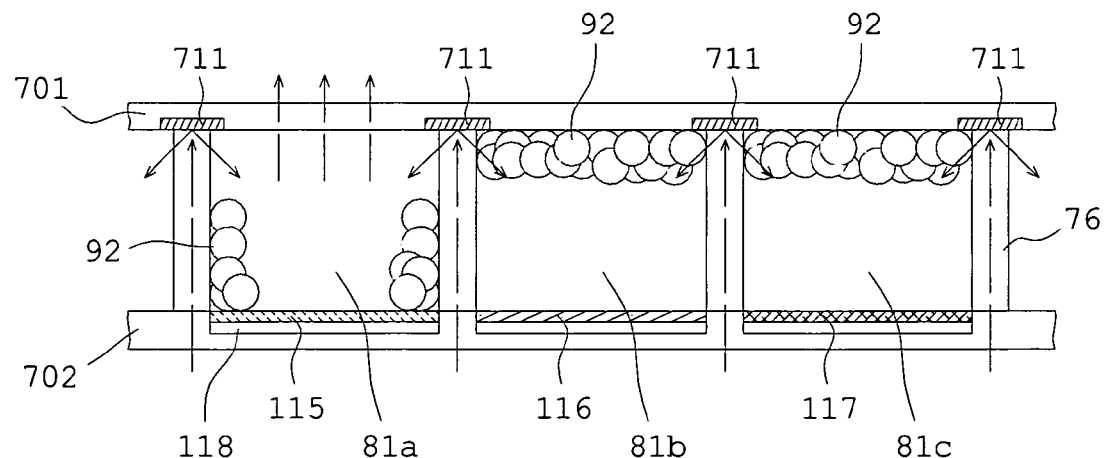
FIG. 11B is a lateral view of the seventh embodiment of the present invention in a RED-state.

FIG. 11A and FIG. 11B show the seventh embodiment of the present invention. The red filter 115, the green filter 116, the blue filter 117 and the bottom reflective plates 118 are disposed on the bottom substrate 702 of the sub-display cells. The light reflected or scattered by the bottom reflective plate 118 goes through the red, green and blue filters so as to show various colors. The bottom reflective plates 118 of the other embodiments can be the respective primary colors reflective plates for each sub-display cell. The light reflected or scattered by the mentioned bottom reflective plates can be used to show various effects. Otherwise, the light source can be a backlight, a surrounding light, or both.

FIG. 11A shows the white state of this embodiment. The pigment particles 92 in the display solutions 81*a*, 81*b* and 81*c* are dispersed leaning against the partitioning walls 76. The light reflected or scattered by the bottom reflective plates 118 passes through each filter 115, 116 and 117 respectively, and radiates white light by mixing the primary colors evenly.

FIG. 11B shows the red state of the display device. The pigment particles 92 are dispersed to block the reflected or scattered light in the display solutions 81*b* and 81*c*, so that no light is emitted. But the pigment particles 92 with absorbing material in the display solution 81*a* are dispersed leaning against the partitioning walls 76, so the light reflected or scattered by the bottom reflective plate 118 passes through the red filter 115 so as to finally display a red state.

Figure 12A:
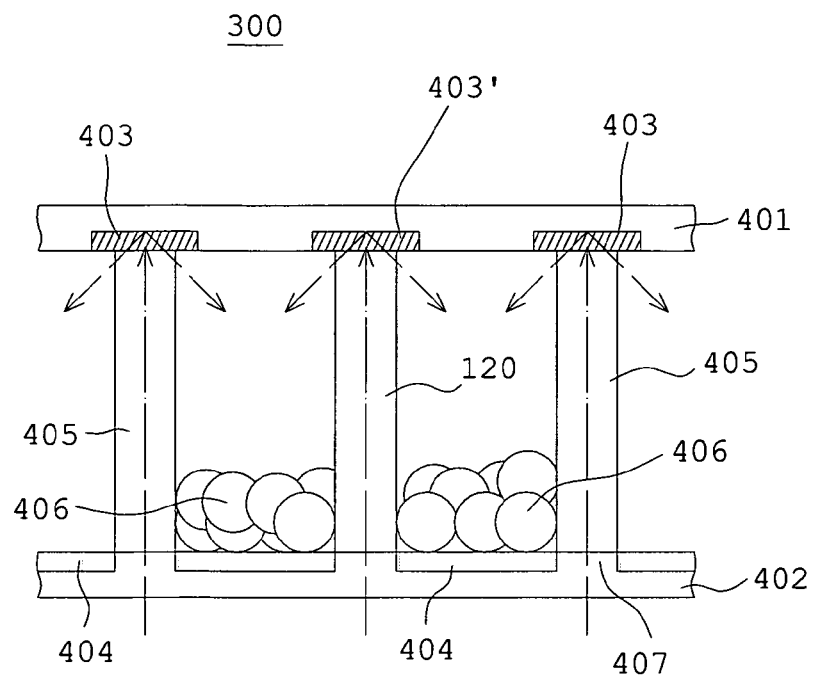
FIG. 12A is a lateral view of the eighth embodiment of the transflective electrophoretic display device of the present invention.

Furthermore, one or a plurality of light guides is installed in the aforementioned space isolated by the partitioning walls in the display device. Reference is made to FIG. 12A, which is a lateral view of the eighth embodiment of the transflective electrophoretic display device. The light from the backlight module emits to the anisotropic reflective plates 403 of the top substrate 401 through the partitioning walls 405, and is reflected to the display solution thereof. However, a light guide 120 connected with the top substrate 401 and the bottom substrate 402 is installed in the space. The backlight can be emitted to the top substrate 401 through the light guide 120. After that, the light is reflected to the display solution by the anisotropic reflective plate 403' disposed at a position relative to the light guides. Whereby, the light guide can enhance the brightness of the transflective electrophoretic display device and facilitate the displaying effect.

Figure 12B:
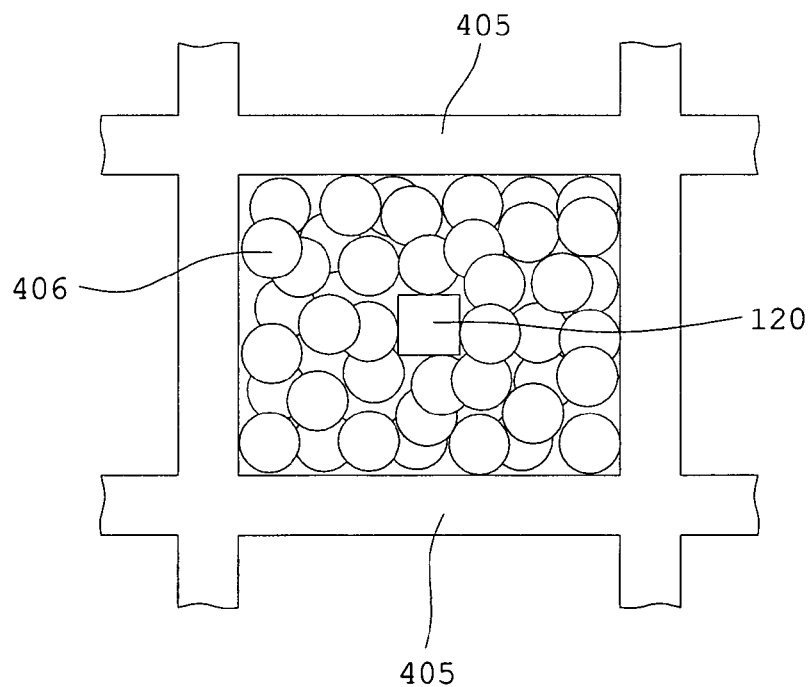
FIG. 12B is an overlooking view of the eighth embodiment of the transflective electrophoretic display device of the present invention.
Figure 12C:
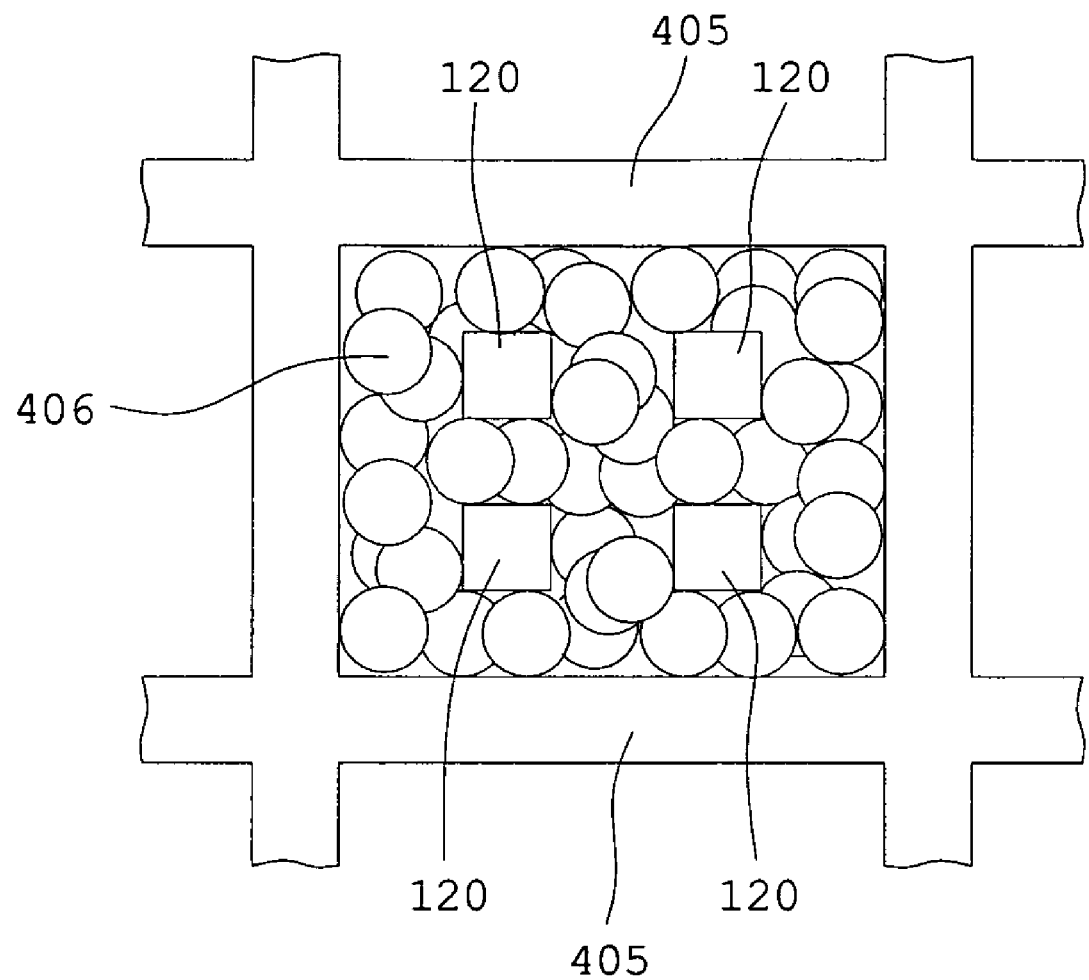
FIG. 12C is an overlooking view of the eighth embodiment of the transflective electrophoretic display device of the present invention.

FIG. 12B is an overlooking view of the display device with the light guide 120. FIG. 12C is the overlooking view of the display device with a plurality of light guides 120 disposed between the top substrate and the bottom substrate of the present invention.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A transflective electrophoretic display device, which is composed of a plurality of display cells, the display device comprises:
    a top substrate, which is a transparent substrate having a plurality of anisotropic reflective plates of the display device;
    a bottom substrate having a plurality of light plates and a plurality of electrodes so as to generate an electric field, and the bottom substrate is installed opposite to the top substrate;
    a plurality of partitioning walls, which are transparent materials and disposed between the top substrate and the bottom substrate so as to isolate the plurality of display cells;
    a display solution, which is composed of a plurality of pigment particles and transparent liquid so as to fill a space isolated by the top substrate, the bottom substrate and the partitioning walls;
    wherein the electric field in the display cell is changed to guide the behavior of the plurality of charged pigment particles in the display solution, a light emits to the anisotropic reflective plates of the top substrate through the partitioning walls, and the plates reflect the light to the display solution so as to radiate monochromatic or gray-scale effects.

2. The transflective electrophoretic display device as recited in claim 1, wherein a light source is disposed below the display device.

3. The transflective electrophoretic display device as recited in claim 1, wherein the anisotropic reflective plates of the top substrate are disposed relative to the partitioning walls.

4. The transflective electrophoretic display device as recited in claim 1, wherein the light plates are reflective plates or absorbing plates.

5. The transflective electrophoretic display device as recited in claim 1, wherein the light plates are chromatic reflective plates.

6. The transflective electrophoretic display device as recited in claim 1, wherein the plurality of pigment particles are white particles, black particles, chromatic particles or chromatic transparent particles.

7. The transflective electrophoretic display device as recited in claim 1, wherein the electrodes of the bottom substrate are a plurality of side electrodes.

8. The transflective electrophoretic display device as recited in claim 1, wherein the electrodes of the bottom substrate generate an in-plane electric field.

9. The transflective electrophoretic display device as recited in claim 1, wherein the electrodes of the bottom substrate and a plurality of electrodes of the top substrate generate an up/down switching mode, an in-plane switching mode or a dual switching mode electric field.

10. The transflective electrophoretic display device as recited in claim 1, wherein one or a plurality of light guides connected with the top substrate and the bottom substrate is disposed in the space isolated by the top substrate, the bottom substrate and the partitioning walls.

11. A transflective electrophoretic display device, the display device is composed of a plurality of display cells, and the display cells are further composed of a plurality of sub-display cells having red, green and blue colors, the display device comprises:
    a top substrate, which is a transparent substrate having a plurality of anisotropic reflective plates of the display device;
    a bottom substrate having a plurality of light plates and a plurality of electrodes so as to generate an electric field, and the bottom substrate is installed opposite to the top substrate;
    a plurality of partitioning walls, which are transparent materials and disposed between the top substrate and the bottom substrate so as to isolate the plurality of sub-display cells;
    a red display solution, which is composed of a plurality of pigment particles and transparent liquid so as to fill a space isolated by the top substrate, the bottom substrate and the partitioning walls;
    a green display solution, which is composed of a plurality of pigment particles and transparent liquid so as to fill a space isolated by the top substrate, the bottom substrate and the partitioning walls;
    a blue display solution, which is composed of a plurality of pigment particles and transparent liquid so as to fill a space isolated by the top substrate, the bottom substrate and the partitioning walls;
    wherein the electric field in the display cell is changed to guide the behavior of the plurality of charged pigment particles in the red, green and blue display solutions, a light emits to the anisotropic reflective plates of the top substrate through the partitioning walls, and the reflective plates reflect the light to the red, green and blue display solutions so as to radiate color effects.

12. The transflective electrophoretic display device as recited in claim 11, wherein a backlight module is disposed below the display device.

13. The transflective electrophoretic display device as recited in claim 11, wherein the anisotropic reflective plates of the top substrate are disposed relative to the partitioning walls.

14. The transflective electrophoretic display device as recited in claim 11, wherein the light plates are reflective plates or absorbing plates.

15. The transflective electrophoretic display device as recited in claim 11, wherein the light plates are scattering-type reflective plates.

16. The transflective electrophoretic display device as recited in claim 11, wherein the plurality of pigment particles are reflective white particles or absorbent black particles.

17. The transflective electrophoretic display device as recited in claim 11, wherein the electrodes of the bottom substrate are a plurality of side electrodes.

18. The transflective electrophoretic display device as recited in claim 11, wherein the electrodes of the bottom substrate generate an in-plane electric field.

19. The transflective electrophoretic display device as recited in claim 11, wherein the electrodes of the bottom substrate and a plurality of electrodes of the top substrate generate an up/down switching mode, an in-plane switching mode or a dual switching mode electric field.

20. The transflective electrophoretic display device as recited in claim 11, wherein one or a plurality of light guides connecting with the top substrate and the bottom substrate is disposed in the space isolated by the top substrate, the bottom substrate and the partitioning walls.

21. A transflective electrophoretic display device, the display device is composed of a plurality of display cells, and the display cells are further composed of a plurality of sub-display cells having red, green and blue colors, the display device comprises:
- a top substrate, which is a transparent substrate having a plurality of anisotropic reflective plates of the display device;
- a bottom substrate having a plurality of light plates and a plurality of electrodes so as to generate an electric field, and the bottom substrate is installed opposite to the top substrate;
- a plurality of partitioning walls, which are transparent materials and disposed between the top substrate and the bottom substrate so as to isolate the plurality of sub-display cells;
- a plurality of display solutions, which are composed of a plurality of pigment particles and transparent liquids, the display solutions fill a space isolated by the top substrate, the bottom substrate and the plurality of partitioning walls of the sub-display cells of the display cells;
- a red filter, which is a transparent material installed on the top substrate or the bottom substrate;
- a green filter, which is a transparent material installed on the top substrate or the bottom substrate;
- a blue filter, which is a transparent material installed on the top substrate or the bottom substrate;

wherein the electric field in the display cell is changed to guide the behavior of the plurality of charged pigment particles in each display solution, a light emits to the anisotropic reflective plates of the top substrate through the partitioning walls, and the reflective plates reflect the light to the display solution and through the red, green and blue filters so as to radiate various effects.

22. The transflective electrophoretic display device as recited in claim 21, wherein a backlight module is disposed below the display device.

23. The transflective electrophoretic display device as recited in claim 21, wherein the anisotropic reflective plates of the top substrate are disposed relative to the partitioning walls.

24. The transflective electrophoretic display device as recited in claim 21, wherein the red, green and blue filters of the top substrate are disposed relative to the space.

25. The transflective electrophoretic display device as recited in claim 21, wherein the red, green and blue filters of the bottom substrate are disposed relative to the space.

26. The transflective electrophoretic display device as recited in claim 21, wherein the light plates are reflective plates or absorbent plates.

27. The transflective electrophoretic display device as recited in claim 21, wherein the light plates are scattering-type reflective plates.

28. The transflective electrophoretic display device as recited in claim 21, wherein the plurality of pigment particles are reflective white particles or absorbent black particles.

29. The transflective electrophoretic display device as recited in claim 21, wherein the electrodes of the bottom substrate are a plurality of side electrodes.

30. The transflective electrophoretic display device as recited in claim 21, wherein the electrodes of the bottom substrate generate an in-plane electric field.

31. The transflective electrophoretic display device as recited in claim 21, wherein the electrodes of the bottom substrate and a plurality of electrodes of the top substrate generate an up/down switching mode, an in-plane switching mode or a dual switching mode electric field.

32. The transflective electrophoretic display device as recited in claim 21, wherein one or a plurality of light guides connecting with the top substrate and the bottom substrate is disposed in the space isolated by the top substrate, the bottom substrate and the partitioning walls.

* * * * *